United States Patent Office 3,502,210
Patented Mar. 24, 1970

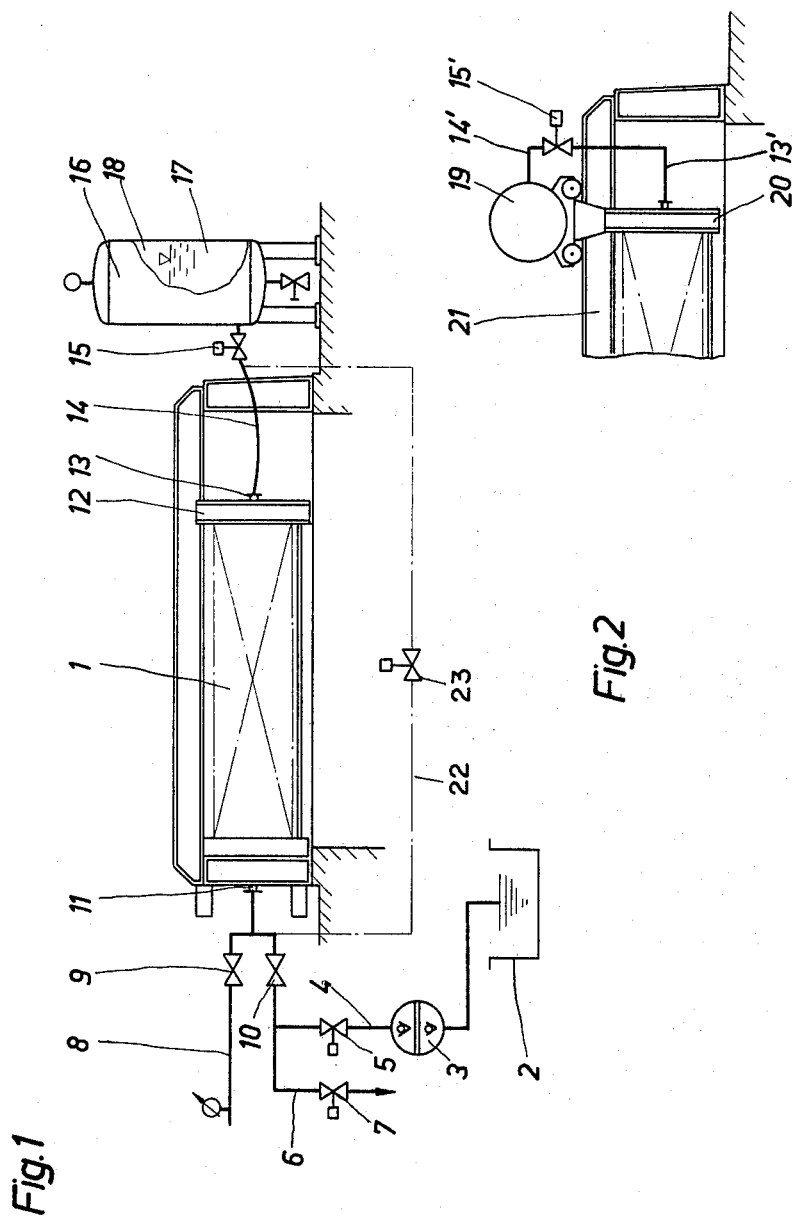

3,502,210
FILTERING PROCESS AND SYSTEM FOR
CARRYING THE PROCESS INTO EFFECT
Oswald Anton Busse and Erwin Hugo Klesper, Michelbach, Nassau, Germany, assignors to Passavant-Werke of Michelbacher Hutte, near Michelbach, Nassau, Germany
Filed June 27, 1966, Ser. No. 560,630
Claims priority, application Germany, June 25, 1965,
P 37,144
Int. Cl. B01j 25/12, 37/04
U.S. Cl. 210—65
5 Claims

ABSTRACT OF THE DISCLOSURE

A process for operating a filter press having a stack of filter plates provided with central apertures precluding during the process of filtration clogging of these apertures and concomitant generation of dangerous pressure levels inside the press. The fluid to be filtered is admitted at one discrete point of the stack and during the process of filtration non-filtered liquid is drained from the stack at another discrete point thereof. The liquid so withdrawn is stored under gas pressure in a storage tank. Admission of fluid to the first discrete point and drainage of fluid from the second discrete point are effected simultaneously. Thus during the process of filtration a flow of liquid is established through the central apertures of the constituent filter plates of the stack in a direction longitudinally thereof.

---

Figure 3:
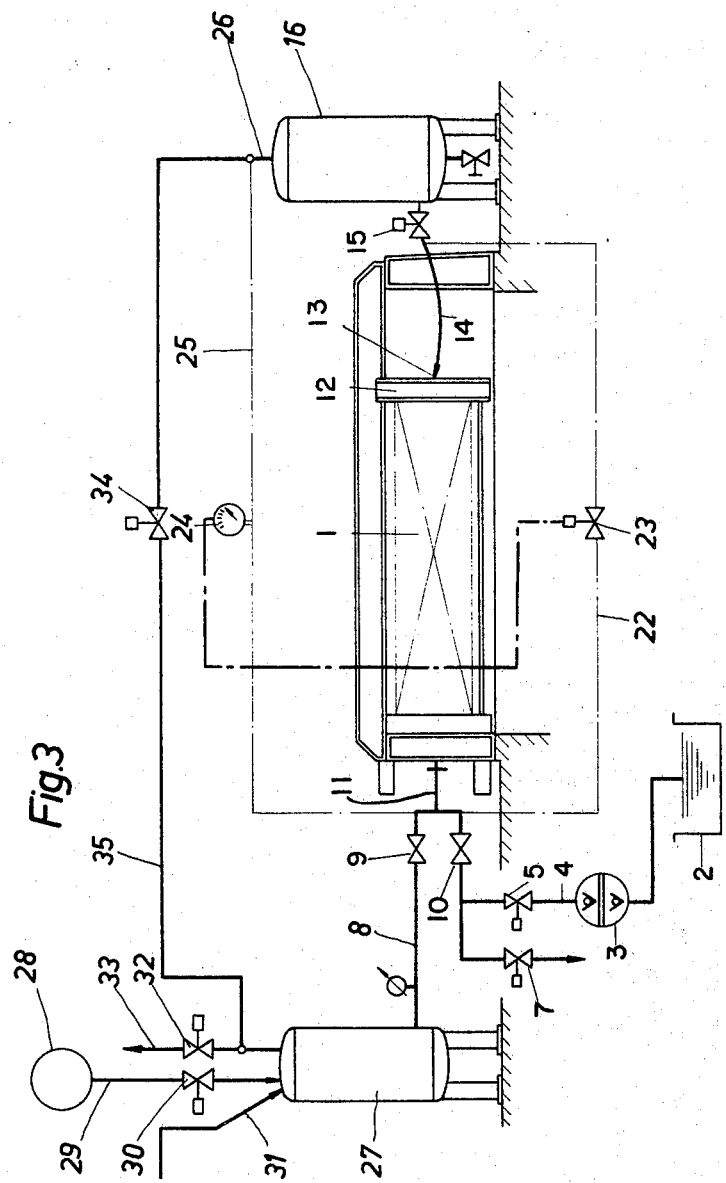

This invention relates to a filtering process, and to a system for carrying that process into effect.

It is one object of this invention to provide an improved process for filtering liquids such as, for instance, sewage, including solid matter, e.g. fibrous materials.

It is another object of this invention to provide an improved process for filtering liquids including solid matter which process precludes the clogging of filter presses by the solid matter contained in the medium to be filtered, and prevents breaking of the filter plates of filter presses resulting from clogging thereof.

The filter plates of filter presses are provided with a central aperture. This aperture may be clogged by foreign matter, particularly fibrous matter which may form clumps, or felt-like impediments. Such clumps, or felt-like impediments, may subject the filter plates of a filter press to excessive pressures which may result in breaking of the plates. The danger is generally present when filtering media including sludge, and particularly when filtering sewage. It is common practice to pre-clean sewage before filtration of the same as, for instance, by means of rakes supposed to collect fibrous matter contained in the sewage. But even if sewage is pre-cleaned before filtration thereof, there may be a residue of fibrous matter therein which is sufficiently large to cause damage to the filter press when the sewage is filtered.

It is another object of this invention to provide a process for filtering liquids, such as sewage, including solid substances by means of a filter press which process avoids all of the aforementioned limitations and drawbacks.

The process according to this invention includes the steps of admitting liquid to be filtered to a filter press at a predetermined point thereof, of removing during the process of filtration of said liquid from said filter press matter admitted to said filter press at a point thereof remote from said predetermined point of admission, and of maintaining pressure at that point remote from said predetermined point of admission while removing matter admitted to said filter press.

By virtue of such removal of matter admitted to the filter press, solid substances which may accumulate in the region of the central apertures of the filter plates remain in continuous motion, thus precluding blocking of these apertures, particularly by masses of fibrous substances which may combine into, and form, felt-like clumps.

The removal of matter admitted to the filter press during the process of filtration may be carried out in either of several ways. The liquid to be filtered may be admitted at one end of the stack of filter plates included in the filter press. Some of the matter admitted at one end of that stack of plates may be removed at the opposite end of said stack of plates by means of a pump whose pressure is somewhat less than the pressure prevailing a the point of admission of liquid to be filtered to the filter press.

If desired the matter removed from the filter press may be recirculated.

It is, however, particularly desirable to store the matter removed from the filter press in a tank containing a volume of gas or air under pressure. The advantages ensuing from proceeding in such a fashion will be discussed below more in detail.

The removal of matter from the filter press should be started only after a sufficient amount of liquid to be filtered has been admitted to the filter press to fill the filter press completely, and to build up therein the pressure which is required for filtration of the liquid.

A filter press may be provided with two openings which may both be used for admitting liquid to be filtered to the filter press. After the filter press has been completely filled with liquid to be filtered, one of these openings may be used for removing from the filter press during the process of filtration matter which has been previously admitted to it, i.e. non-filtered liquid. While removing matter from the filter press during the process of filtration, an elevated pressure must be maintained at the point of removal. Filling of the filter press with liquid to be filtered at two points thereof of which one is subsequently used for the removal of matter from it greatly reduces the time required for filling the filter press and is, therefore, a particularly desirable way of carrying this invention into effect.

If the matter removed from the filter press is stored in a tank containing a volume of gas or air under pressure, the matter removed from the filter press during one filtering cycle may be fed back to the filter press during the subsequent filtering cycle.

The danger of clogging the central apertures of the filter plates included in a filter press is particularly large subsequent to filling of the filter press when the pressure required for filtering the liquid to be filtered is being built-up. In the subsequent period of time when that pressure has been built up, the danger of clogging of the filter plates of the filter press is far less than prior to this time. It is, therefore, desirable to remove matter from the filter press at the beginning of the filtering operation at a relatively higher rate than toward the end of the filtering operation. The amount of matter removed from the filter press is progressively decreased to smaller and smaller quantities if the matter removed from the filter press is stored in a tank containing a volume of gas or air under pressure, since the rate of removal of matter from the filter press decreases progressively by the progressive increase of the pressure of the volume of gas or air under pressure contained in the tank resulting from the continued admission of matter from the filter press into the tank. In other words, the rate of removal of matter from the filter press may be decreased progressively by progressively increasing the back pressure prevailing at the point of removal of matter from the filter press.

The matter removed from the filter press and stored in a tank containing a volume of gas or air under pressure may be fed back into the filter press through the opening of the filter press through which it has been previously removed from it by increasing the pressure of gas or of air in the aforementioned tank. Simultaneously the filter press may be filled with liquid to be filtered at another point thereof by an appropriate pressure pump. If the filter press is being filled in this fashion at two separate points, the time for filling the filter press may be minimized. When the filter press is completely filled and a sufficiently high amount of pressure prevails therein, the direction of flow in the conduit connecting the tank containing a volume of gas or air under pressure may be reversed by reducing the pressure in the aforementioned tank. The back pressure in the aforementioned tank increases progressively at a relatively larger rate, the larger the quantity of matter which flows from a filter press into the tank. As mentioned above, this progressive increase of the back pressure in the tank results in a progressive decrease of the rate of flow from the filter press to the storage tank.

The aperture in the filter press for removing matter from it and introducing the same into it may be arranged adjacent the center of the stack of filter plates included in the filter press.

Filtering a liquid by means of a filter press is not a continuous process but a batch process which includes a plurality of filtering cycles which are performed sequentially. The aforementioned tank containing a volume of air or gas under pressure is being disconnected from the filter press at the end of each filtering operation or cycle, and reconnected to the filter press at any subsequent filtering operation or cycle.

It may be desirable to provide a system according to this invention for filtreing liquids with a pressure difference sensing instrument communicating with the point of admission to the filter press of liquid to be filtered, and with the point of the filter press remote from said first mentioned point where matter is being removed from the filter press. Such a pressure difference sensing instrument indicates whether or not the difference at the two aforementioned points is within permissible limits. The system may also be provided with a pressure equalization conduit extending from said first point to said second point of the filter press, a normally closed valve controlling said conduit, and means under the control of the aforementioned pressure sensing instrument for operating said valve in response to a predetermined maximal pressure difference. By means of such an instrument excess pressure which might result from clogging of one or more of the central perforations in the filter plates of the filter press and might result in rupture of the filter press if not timely detected and controlled may readily be detected and avoided. The indications of the aforementioned pressure difference sensing instrument may be considered as a warning for interrupting the process of filtration before one or more of the filter plates of the filter press may be ruptured.

If the matter removed from the filter press is stored in a tank which contains also a volume of gas or air under pressure, the gas or air under pressure should be replenished from time to time. Air under pressure may be admitted to the aforementioned tank from a source of air under pressure which is also used for other purposes. Most systems for processing sewage include a filter plate filter aid coating system which includes a source of air under pressure. In such a filter plate filter aid coating system ash resulting from the combustion of sewage may be used as filter aid for coating the filter plates of a filter press. The source of air under pressure included in the filter plate filter aid coating system may be used for replenishing the air under pressure contained in the tank in which matter removed from the filter press is being stored. The geometry of the system may be varied in any of several ways. It is, for instance, possible to admit the liquid to be filtered at a point of the stack of filter plates of a filter press which is situated midway between the ends of the stack. In such an arrangement matter may be removed during the process of filtration of the liquid at either or both ends of the stack of filter plates. To this end, tanks for storing the matter removed from the filter press of which each contains a volume of gas or air under pressure may be arranged at either or both ends of the stack formed by the constituent filter plates of the filter press.

The aforementioned arrangement may be reversed, if desired, i.e. liquid to be filtered may be initially admitted to the filter press at both ends of the stack of filter plates thereof. In that arrangement matter may thereafter be removed from the filter press during the process of filtration at a point of the filter press midway between the ends thereof. The opening of the filter press which is situated midway between the ends thereof may be connected to a storage tank which contains, in addition to matter removed from the filter press, also a volume of air under pressure. The last referred-to arrangement is particularly desirable in connection with large high capacity filter presses because it greatly reduces the time required for filling the filter chambers thereof with liquid.

In some instances it may be desirable to mount the tank for storing the matter removed from the filter press on one of two relatively movable portions of the filter press. For instance, the aforementioned tank may be mounted on a carriage supporting some of the filter plates of the filter press in addition to the aforementioned tank. If the tank is mounted on a carriage, or the like, which is movable relative to fixed structural elements of the filter press, the filter press and the tank ought to be connected by a flexible pressure hose.

The liquid storage capacity of the tank for storing matter removed from the filter press is a matter of considerable importance. Preferably the aforementioned tank should have a capacity of 200 to 300% of the liquid-receiving capacity of the filter press. There are two main reasons for imparting a relatively large capacity to the tank for storing matter removed from the filter press: The large storage capacity is conductive to achieving sufficient movement of solid matter inside of the filter press so as to preclude clogging of the central apertures of the filter plates therof. On the other hand, matter which has been removed from the filter press and stored in a large tank under pressure may be used for rapidly refilling the filter press preparatory to performing the next filter operation or filter cycle.

The drawings illustrate diagrammatically several embodiments of the invention.

FIG. 1 shows a filter press adapted for admission of liquid to be filtered at one end thereof and for removal of matter from its filter chamber at the other end thereof;

FIG. 2 shows a portion of the same filter press as shown in FIG. 1 including a tank for storing matter removed from the filter press which tank is supported by a carriage and movable relative to some of the fixed structure of the filter press, and FIG. 3 shows the same system as FIG. 1, however, including some auxiliaries such as a safety device for precluding excess pressure inside the filter chamber of the filter press and particular means for replenishing the supply of air under pressure inside the tank for storing matter removed from the filter press.

Referring now to the drawings, and more particularly to FIG. 1 thereof, numeral 1 has been applied to generally indicate a filter press made up of a stack of superimposed filter plates having a central aperture. Such filter presses are well known in the art, and, therefore, do not need to be described in detail in this context. A filter press of the aforementioned character is discolsed in detail in U.S. Patent 1,271,425 to W. Buckley, issued July 2, 1918 for Apparatus for Pressing Activated Sludge. Numeral 2 has been applied to indicate a reservoir for storing a liquid to be filtered, e.g. sewage. The liquid to be filtered may be admitted to the filter press 1 by a conduit 4 which includes a pressure pump 3 and a valve 5 for opening and closing conduit 4 at will. Conduit 6 communicating with conduit 4 and including a valve 7 is provided for draining pump 3. Conduit 8 is provided for admitting to the filter press 1 a suspension of liquid and of a filter aid, e.g. a suspension of ash in water which may be used for coating the filter plates of press 1 with ash. Conduit 8 is provided with a valve 9, and the downstream end of conduit 4 is provided with a valve 10. Valves 9 and 10 may be coupled by a linkage, or interlocked, in such a way that when one of the valves is open the other is closed, and vice versa. The left fixed end plate of filter press 1 is provided with conduit 1 for admitting liquids to the filter press. Conduit 11 communicates with both conduits 4 and 8. Reference numeral 12 has been applied to indicate the right end plate of the filter press provided with a duct or conduit 13 to which a flexible hose 14 is connected. The right end of flexible hose 14 is connected to tank 16 by the intermediary of a closing valve 15. A portion of the side wall of tank 16 is broken away, thus exposing to view liquid matter 17 inside the tank, and a cushion 18 of air under pressure at the upper level of tank 16.

If it is intended to fill filter press 1 with liquid contained in reservoir 2, valves 5 and 10 are opened and pump 3 is being operated. To speed up filling of filter press 1, valve 15 may be opened. As a result, liquid matter retained in tank 17 from a previous duty cycle of the system and requiring to be filtered, is pushed into the filter press 1 through duct or conduit 13 under the action of the cushion 18 of air under pressure above the liquid 17 inside of tank 16.

Upon filling of filter press 1 with liquid to be filtered, e.g. sewage, the pressure prevailing in the filter chamber thereof is further increased by continued operation of pressure pump 3. When the pressure inside of filter press 1 exceeds the pressure exerted by the cushion 18 of air under pressure upon the liquid 17 inside of tank 16, liquid matter admitted through conduit 11 in filter press 1 is expelled out of the latter through duct or conduit 13 in end plate 12 from where it flows into tank 16, raising the level of liquid therein further and compressing the cushion 18 of air under pressure. This flow of liquid across the central apertures in the constituent filter plates of filter presses 1 effectively precludes clogging of these apertures with solid matter included in the liquid to be filtered. On account of the fact that the pressure of the cushion 18 of air inside of tank 16 increases, the more liquid is admitted into tank 16 through hose 14 and valve 15, the rate of flow of liquid through hose 14 and valve 15 decreases progressively as the cushion 18 of air under pressure is progressively compressed by the admission of liquid into tank 16.

Upon completion of a filtrating cycle, or operating cycle, of filter press 1 valve 15 is closed and valves 10 and 7 are opened. This results in emptying of the filter chember of filter press 1 through conduit 6. Upon removal of the filter cake formed on the filter plates of filter press 1 filter press 1 may be refilled with liquid to be filtered, i.e. a subsequent filter cycle may be started.

Referring now to FIG. 2, this figure shows to a filter press including a tank 19 for storing liquid under the action of air under pressure. The liquid stored in tank 19 has been drained from the filter press at a point other than the main point of admission of liquid into the filter press. As shown in FIG. 2 tank 19 is integral with the right end plate of the filter press, and both are secured to a carriage on rollers which is supported by the fixed frame structure 21 of the filter press. End plate 20 and tank 19 are jointly movable relative to the fixed or stationary portions of the filter press. End plate 20 is provided with a conduit 13' connected to pipe line 14' including closing valve 15' and ending in tank 19. Pipe line or duct 14' of FIG. 2 corresponds to duct or pipe line 14 of FIG. 1 and serves the same purpose as the latter. Similarly conduit 13' of FIG. 2 corresponds to conduit 13 of FIG. 1, and both serve the same purpose. This applies also to closing valve 15' of FIG. 2 and closing valve 15 of FIG. 1.

Referring now again to FIG. 1, it is possible, as stated above, to admit liquid to be filtered from reservoir 2 to the filter press 1 simultaneously through conduits 11 and 13. In the structure of FIG. 1 filter press 1 may be provided with a third conduit situated between conduits 11 and 13, about midway between conduits 11 and 13, and this third or additional conduit (not shown) may be connected to tank 16 with its cushion 18 of air under pressure.

As another alternative, the above referred-to third or additional conduit (not shown) midway between conduits 11 and 13 may be used for admitting liquid to be filtered from reservoir 2 through the intermediary of pressure pump 3 into the filter chamber of filter press 1. In that particular modification the filter press may be provided with two tanks for storing under pressure matter removed from the filter press. One of these tanks may be connected to conduit 11 and the other of these tanks may be connected to conduit 13. As mentioned before, this latter modification is particularly desirable if the filter press is large and its filtering capacity per operating cycle is high.

The system shown in FIG. 3 does not require a description of the portions thereof identical with those of the system shown in FIG. 1, and described in detail in connection with FIG. 1. The system shown in FIG. 3 will, therefore, be described only to the extent that it differs signifiicantly from the system shown in FIG. 1 and described in connection with that figure. The conduit 4 for admission of liquid to be filtered to filter press 1 and the conduit 13 connected to flexible hose 14 for the removal of liquid from filter press 1 are interconnected by a conduit to which numeral 22 has been applied. Conduit 22 bypasses or shunts the filter chamber formed in filter press 1. Conduit 22 includes a shut-off valve 23 which is normally closed. Reference numeral 24 has been applied to indicate a pressure-difference indicating measuring instrument. That instrument communicates with the point of admission of liquid to be filtered to filter press 1, and it further communicates with the volume of air or gas under pressure inside of tank 16. Reference numeral 25 has been applied to indicate the conduit connecting pressure sensing element 24 to the two aforementioned points. Reference numeral 26 has been applied to indicate a conduit or extension situated at the highest point of tank 16 which is connected in series with a conduit 35. Instrument 24 indicates whether the pressure inside of filter press 1 is within allowable limits, or is too high. If the pressure is too high, appropriate countermeasures may be taken, as set forth above. Instrument 24 may control conventional means such as, for instance, a servo motor (not shown) for opening valve 23 if and when a predetermined maximal pressure difference is exceeded. Upon opening of valve 23, the pressure at both ends of the filter pressure 1 is equalized. The means for controlling valve 23 by pressure sensor 24 are illustrated diagrammatically in FIG. 3 by a dash-and-dot line from part 23 to part 24.

Reference numeral 27 has been applied in FIG. 3 to indicate a reservoir or tank containing a suspension used as filter aid, e.g. a suspension of ash in water. The filter aid proper is stored in container 28, and admitted to reservoir or tank 27 through a conduit 29 under the control of a closing valve 30. The filter aid may be mixed with a liquid such as filtrate produced at some point of the filtering system. Such mixing means have been deleted in FIG. 3. Reference numeral 31 has been applied to indicate a conduit for admitting air under pressure from a source of air under pressure (not shown), e.g. a compressor, to reservoir or tank 27 and reference numeral 33 has been applied to indicate a venting conduit, or air dumping conduit, connected to the top of reservoir or tank 27 and under the control of a closing valve 32. The aforementioned conduit 35 is connected on one end thereof to the upper end of tank or reservoir 27, and is connected on the other end thereof to conduit 26, or to the upper end of tank 16, respectively. Conduit 35 is controlled by a closing valve 34. Each operating cycle of the filter press 1 is preceded by a coating operation for coating of the filter plates of the filter press with a filter aid such as, for instance, ash. To this end air under pressure is admitted to reservoir or tank 27 through conduit 31. This results in a rapid flow of the suspension intended to be used as filter aid from reservoir or tank 27 through conduit 8 into filter press 1. During the operation of coating the filter plates of filter press 1 with a filter aid, valve 10 must be closed and valve 9 must be open (see also FIG. 1). Valve 30 is closed during the period of time when, and as long as, filter aid suspension is shot from tank or reservoir 27 into filter press 1.

In order to fill filter press 1 with liquid to be filtered, filter press 1 must be vented. This may be achieved by venting conduit 33 whose closing valve 32 is opened for this purpose.

It is, however, preferable to vent reservoir or tank 27 not to the open atmosphere, but into tank 26, thus saving the air under pressure in tank or reservoir 27 for the purpose of replenishing tank 16 with air under pressure. Upon opening of valve 34 air under pressure rushes from tank or reservoir 27 through conduit 35 into tank 16 and increases the pressure prevailing therein. As a result, liquid contained in tank 16 is admitted to filter press 1 through hose 14 and conduit 13, thus greatly accelerating filling of filter press 1 with liquid to be filtered. While liquid stored in tank 16 is admitted to filter press 1 on the left end thereof, another jet of liquid to be filtered may be injected into the filter press 1 by means of pressure pump 3 and through conduit 11.

It will be understood that we have illustrated and described herein preferred embodiments of our invention, and that various alterations may be made in the details of the method and of the structure shown without departing from the spirit and scope of the invention.

We claim as our invention:

1. A process for filtering liquids wherein solid substances are suspended, such as sewage, by means of a filter press having a stack of filter plates provided with central apertures, said process including, in combination, steps of
    (a) simultaneously admitting liquid to be filtered to a first discrete point of said stack of filter plates and to a second discrete point of said stack of filter plates spaced from said first discrete point in a direction longitudinally of said stack of filter plates until the press is filled with liquid to be filtered, and
    (b) thereafter draining non-filtered liquid from said second discrete point of said stack of plates while continuing to admit liquid to be filtered to said first discrete point and admitting the effluent from said second discrete point of said stack of plates into a storage tank while maintaining an elevated gas pressure above atmospheric in said storage tank and to thereby establish after said filter press has been filled with liquid during the process of filtration a flow of liquid in a direction longitudinally of said stack of plates through the central apertures in the constituent filter plates thereof.

2. A process for filtering liquids wherein solid substances are suspended, such as sewage, by means of a filter press having a stack of filter plates provided with central apertures, said process including, in combination, the steps of
    (a) simultaneously admitting liquid to be filtered to a first discrete point of said stack of filter plates and to an additional discrete point of said stack of filter plates spaced from said first discrete point of said stack of filter plates in a direction longitudinally of said stack of filter plates until said filter press is filled with liquid, and
    (b) thereafter draining non-filtered liquid from a second discrete point of said stack of filter plates spaced from said first discrete point of said stack of filter plates and from said additional discrete point of said stack of filter plates in a direction longitudinally of said stack of filter plates into a storage tank against the action of elevated pressure above atmospheric maintained therein while continuing to admit liquid to be filtered to said first discrete point and to thereby establish during the process of filtration a flow of liquid in a direction longitudinally of said stack of plates through the central apertures of the constituent plates thereof.

3. A process for filtering liquids wherein solid substances are suspended, such as sewage, by means of a filter press having a stack of filter plates provided with central apertures, said process including, in combination, the steps of
    (a) admitting liquid to be filtered to a filter press at a first discrete point of the stack of filter plates thereof having a predetermined position in a direction longitudinally of said stack;
    (b) draining non-filtered liquid from said filter press at a second discrete point of said stack of filter plates spaced from said first discrete point of said stack of filter plates in a direction longitudinally of said stack of filter plates;
    (c) establishing an elevated gas pressure above atmospheric in a storage tank for storing the effluent drained from said second discrete point of said stack of filter plates;
    (d) admitting the effluent from said second discrete point of said stack of filter plates into said storage tank against the action of the elevated gas pressure prevailing therein while admitting liquid to be filtered to said first discrete point of said stack of filter plates and to thereby establish during the process of filtration a flow of liquid in a direction longitudinally of said stack of filter plates through the central apertures of the constituent plates thereof; and
    (e) measuring the difference in pressure at said first discrete point of said stack of filter plates and at said second discrete point of said stack of filter plates, and of effecting an equalization of the pressure at said first discrete point of said stack of filter plates at said second discrete point of said stack of filter plates when said difference reaches a predetermined maximum value.

4. A system for filtering liquid media and preventing during the process of filtration clogging of a filter press and generation of dangerous pressure levels therein, said system including in combination
    (a) a filter press having a stack of filter plates provided with central apertures and defining a cavity having a predetermined liquid-receiving capacity;
    (b) a first duct for admitting to said press liquid to be filtered and having an orifice situated at a first discrete point of said stack;
    (c) a source of gas under pressure;
    (d) means for draining non-filtered liquid from said press against the pressure of said source of gas under pressure, said means including a second duct having an orifice situated at a second discrete point of said stack spaced from said first discrete point of said stack in a direction longitudinally thereof, and said means further including a storage tank communicating with said source of gas under pressure and connected to the end of said second duct remote from said stack, said storage tank having a capacity exceeding the liquid-receiving capacity of the filter press;
(e) a valve interposed in said second duct between said stack and said storage-tank to selectively connect said stack to and disconnect said stack from said storage tank; and
(f) a pressure difference sensing instrument communicating with said first discrete point of admission to said filter press of liquid to be filtered and with the volume of gas under pressure in said storage tank.

5. A system as specified in claim 4 including a pressure equalization conduit extending from said first discrete point to said second discrete point of said filter press, a normally closed valve controlling said conduit, and means under the control of said pressure sensing instrument for opening said valve in response to a predetermined maximal pressure difference.

References Cited

UNITED STATES PATENTS

| | | | |
|---|---|---|---|
| 636,054 | 10/1899 | Murphy | 210—225 |
| 885,398 | 4/1908 | Sweetland | 210—224 |
| 1,271,425 | 7/1918 | Buckley | 210—97 |
| 1,488,862 | 4/1924 | Burchenal | 210—228 X |
| 2,417,958 | 3/1947 | Teale | 210—225 X |
| 3,015,395 | 1/1962 | Stram et al. | 210—225 X |

FOREIGN PATENTS

| | | |
|---|---|---|
| 1,111,509 | 11/1955 | France. |
| 794,733 | 5/1958 | Great Britain. |

REUBEN FRIEDMAN, Primary Examiner

C. M. DITLOW, Assistant Examiner

U.S. Cl. X.R.

210—137, 224